United States Patent [19]

Polansky et al.

[11] Patent Number: 4,614,292

[45] Date of Patent: Sep. 30, 1986

[54] DIE BONDER WITH ELECTRICALLY DRIVEN SCRUBBING MEANS

[75] Inventors: Carl Polansky, Landisville, Pa.; Frank Z. Hawrylo, Trenton, N.J.

[73] Assignee: RCA Corporation, Princeton, N.J.

[21] Appl. No.: 781,987

[22] Filed: Sep. 30, 1985

[51] Int. Cl.$^4$ .............................................. B23K 1/06
[52] U.S. Cl. .................................. 228/1.1; 228/3.1; 228/6.1; 310/15
[58] Field of Search .................. 228/3.1, 1.1, 6.1; 310/15

[56] References Cited

U.S. PATENT DOCUMENTS

| | | | |
|---|---|---|---|
| 3,302,277 | 2/1967 | Pruden et al. | 29/407 |
| 3,451,607 | 6/1969 | Miller et al. | 228/1 |
| 3,790,738 | 2/1974 | Laub et al. | 228/1.1 |
| 3,822,465 | 7/1974 | Frankort et al. | 29/470.1 |

Primary Examiner—Nicholas P. Godici
Assistant Examiner—Karen Skillman
Attorney, Agent, or Firm—B. E. Morris; W. J. Burke; H. R. Ball

[57] ABSTRACT

A die bonder for bonding a semiconductor die to a substrate is disclosed. The die bonder comprises a support assembly within a frame, which assembly supports an arm. Attached to said arm is a means for holding a die, e.g. a vacuum collet. A variable electrical scrubbing means comprises a plunger which oscillates reciprocally within an electromagnetic coil and contacts the arm, or a tab integral with said arm. This provides a corresponding uniform scrubbing action, perpendicular to said arm in the plane of the interface between the die and the substrate, between a die held by the holding means and a solder material interposed between the die and substrate.

4 Claims, 6 Drawing Figures

DIE BONDER WITH ELECTRICALLY DRIVEN SCRUBBING MEANS

This invention relates to a die bonder for bonding a semiconductor die to a substrate and more particularly concerns a die bonder with an electrical scrubbing means.

BACKGROUND OF THE INVENTION

Die bonders are presently in use for the mounting of semiconductor devices, e.g. lasers, LEDs, detectors, transistors and the like, onto substrates. A solder or bonding material is interposed between the semiconductor die and substrate and can be in the form of a solder preform, liquid solder, bonding pads, or layers on the die and/or substrate. The die bonder provides pressure and/or heat to bond the die to the substrate.

Most prior art die bonders include a scrubbing means. Scrubbing is an oscillation (generally in the plane of the solder) of the semiconductor die while in contact with the solder material. Scrubbing action is known to break up the oxide, or skin, which may form on the solder material and generally provides better wetting of the solder to the die. Scrubbing is carried out in a bonding system where heat is the source of energy primarily responsible for bonding to occur. It may also be employed in thermocompression techniques employing heat and pressure. It is distinguished, however, from ultrasonic bonding techniques wherein high frequency oscillations of 15,000 to 20,000 Hertz (Hz) are the primary source of energy to provide bonding.

A typical prior art scrubbing mechanism includes an eccentric cam, which mechanically induces an oscillation between the die and the solder. This mechanical scrubbing has caused problems, however, when used to bond facet emitters such as lasers and LEDs to substrates. A die bonder with a more sensitive, accurate, and controllable scrubbing mechanism has been sought.

SUMMARY OF THE INVENTION

A die bonder for bonding a semiconductor die to a substrate is disclosed. The die bonder comprises a support assembly within a frame, which assembly supports an arm. Attached to said arm is a means for holding a die, e.g. a vacuum collet. A variable electrical scrubbing means comprises a plunger which oscillates reciprocally within an electromagnetic coil and contacts the arm, or a tab integral with said arm. This provides a corresponding uniform scrubbing action, perpendicular to said arm in the plane of the interface between the die and the substrate, between a die held by the holding means and a solder material interposed between the die and substrate.

DETAILED DESCRIPTION OF THE PREFERRED EMBODIMENTS

The present invention is best explained by a description of a prior art die bonder and the problems entailed therein.

Figure 1:
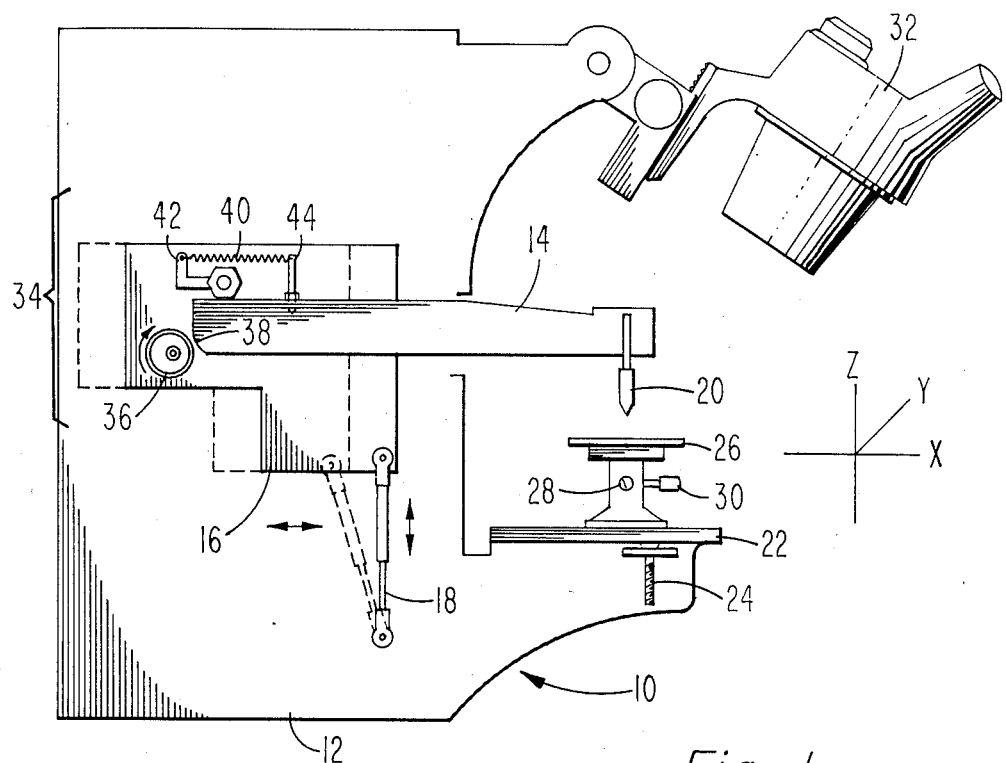
FIG. 1 is a cross-sectional view of a prior art die bonder.

A prior art die bonder 10, illustrated in cross-section in FIG. 1, includes a frame 12 which houses and supports the components of the apparatus. An arm 14 is supported at one end by a support assembly 16. A control rod 18 is connected to the support assembly 16 for moving the assembly 16 and the arm 14 along the x, y and z axes as indicated in FIG. 1.

A holding means 20, such as a vacuum collet, of suitable size and shape to pick up a semiconductor die, is attached to a second end of the arm 14. A platform 22 mounted on the frame 12 below the holding means 20 is movable along the z axis by means of an adjusting screw 24. Mounted on the platform 22 is a workstage 26 to support and heat the substrate onto which a semiconductor die will be bonded. The workstage 26 is adjustable along the x and y axes by using manipulator knobs 28, 30. Suitable optics 32 are provided for viewing the bonding process to insure proper alignment of the die to the substrate.

The prior art die bonder 10 also includes a scrubbing means 34, typically a mechanical means of oscillating the arm 14 and holding means 20. The oscillating motion can be provided by the rotation of an eccentric cam 36 which contacts a beveled surface 38 of the arm 14. A spring 40 connected between a fastener 42 and a stud 44 returns the arm 14 to its rearward position after it has been pushed forward by the cam 36.

One problem encountered with this mechanically induced scrubbing has been that the force pushing the collet arm 14 forward (i.e. towards the workstage 26) and backward along the x axis is non-uniform. Specifically, the force is greater at the extremes of the oscillatory motion especially in the forward direction. This is apparently inherent to such a mechanically induced scrubbing means and can create an uneven thickness of solder material beneath the semiconductor die, as well as a buildup of solder material on the die facets.

Figure 2:
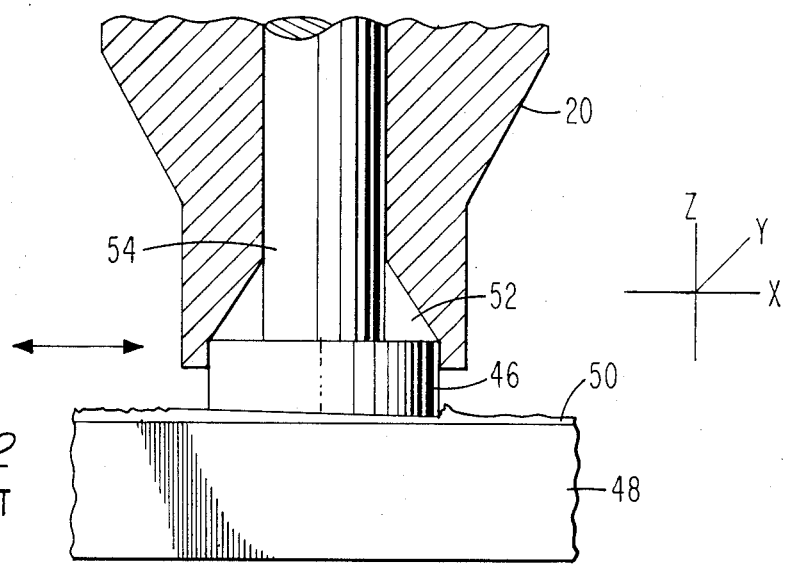
FIG. 2 illustrates a die scrubbed into a solder material using the prior art.

In FIG. 2, a die 46 is shown mounted to a substrate 48 which is covered by a solder 50. The die 46 is shown being scrubbed into the solder 50 by the holding means 20 of FIG. 1 which includes a recess 52 to accommodate the die 46 and a vacuum capillary 54 to hold the die 46 in place. It can be seen that the solder 50 has an uneven thickness under the die 46. This can result in voids under the die 46 after bonding is completed or in the die 46 being tilted relative to the substrate 48. Further, there is a buildup of the solder 50 on the front of the die 46. In many semiconductor devices, such as facet-emitting lasers and LEDs, solder on the facet can cause an electrical short. These facet emitters comprise expitaxially grown semiconductor layers of various conductivity types on a semiconductor body and are typically mounted grown side down. This places the emitting region only a few microns from that surface of the die 46 which contacts the solder 50. Therefore, even the least amount of solder 50 on the facet 56 renders the devices useless. Most mechanically induced scrubbing means have not been suitable for facet-emitting devices.

Figure 3:
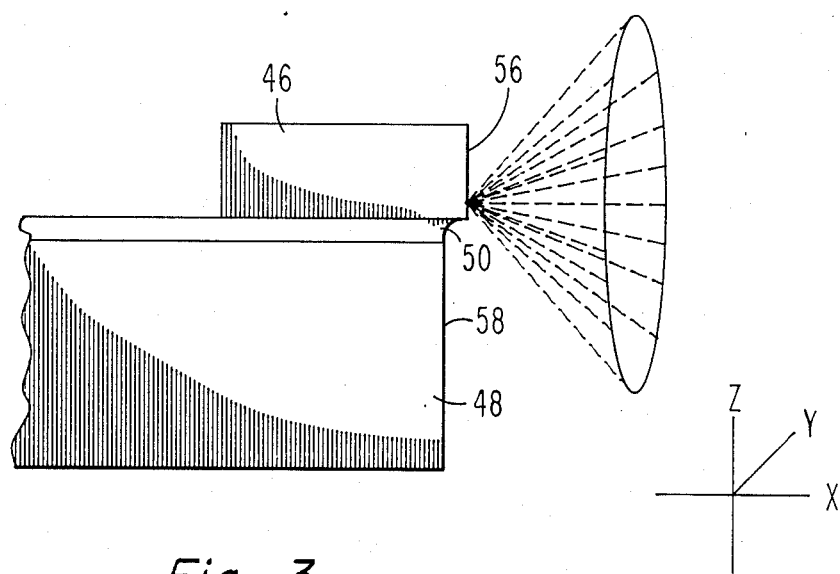
FIGS. 3 and 4 illustrate a facet emitting die mounted on a substrate using the prior art.
Figure 4:
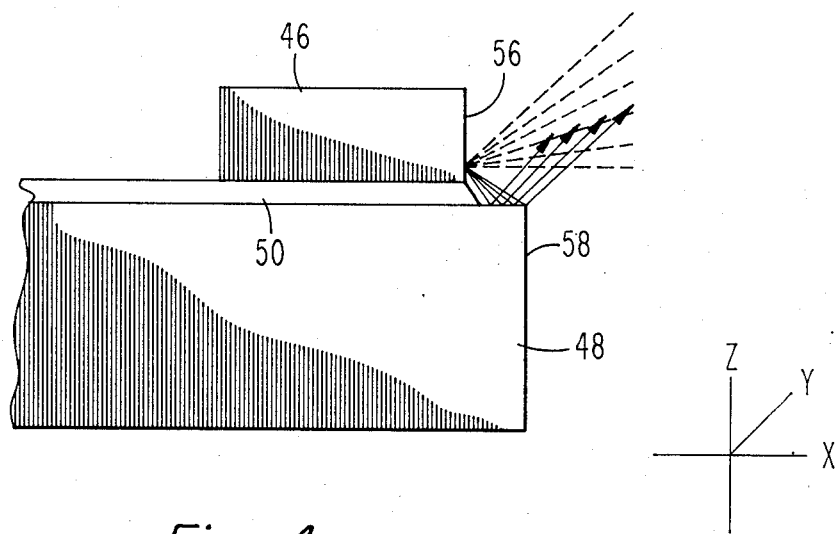

Another problem, if the die 46 is a light emitter, is illustrated in FIGS. 3 and 4. Since the scrubbing action in commercially available die bonders is typically along the x axis, as shown in FIGS. 1 and 2, alignment of the facet 56 of the die 46 with the edge 58 of the substrate 48 becomes almost impossible. This is because there is no way of knowing the final position of the die 46 once the mechanical scrub is disengaged. FIG. 3 shows the front facet 56 overhanging the edge 58. In this situation, the lack of heat dissipation at the hottest part of the die 46 can cause premature failure of the device. In FIG. 4, the front facet 56 is recessed from the edge 58 causing interference of the light emitted by the die 46.

Figure 5:
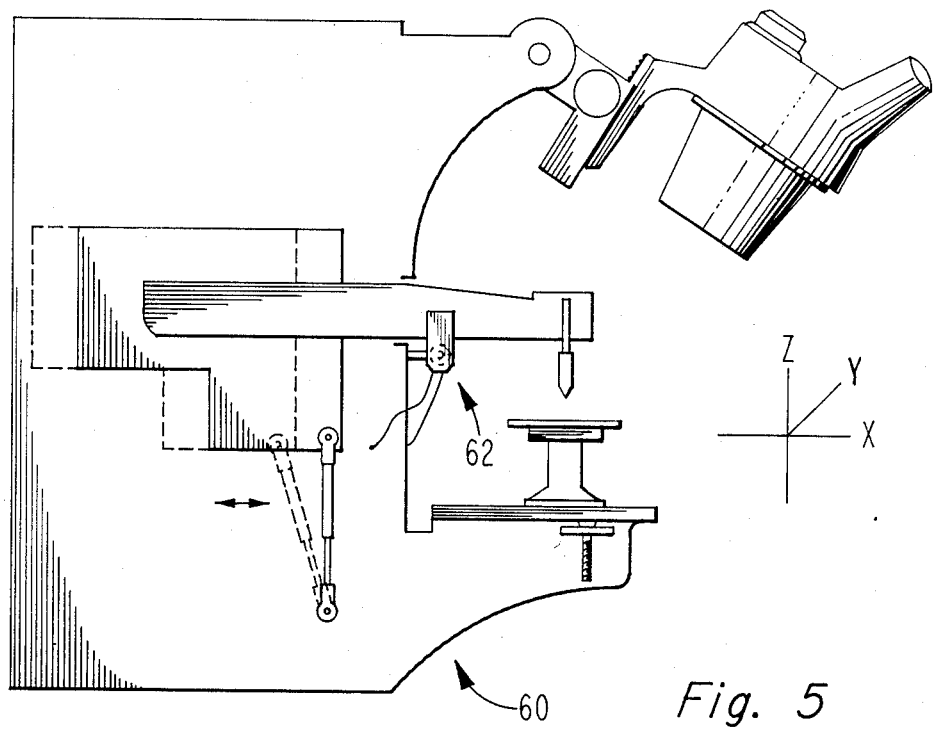
FIG. 5 is a cross-sectional view of a die bonder according to the present invention.

These problems are substantially alleviated by the die bonder 60 of the present invention, as illustrated in FIG. 5, which includes most of the same components shown on the prior art die bonder 10 of FIG. 1. However, in FIG. 5 an electrical scrubbing means 62 is substituted for the mechanical scrubbing means 34 of FIG. 1.

Figure 6:
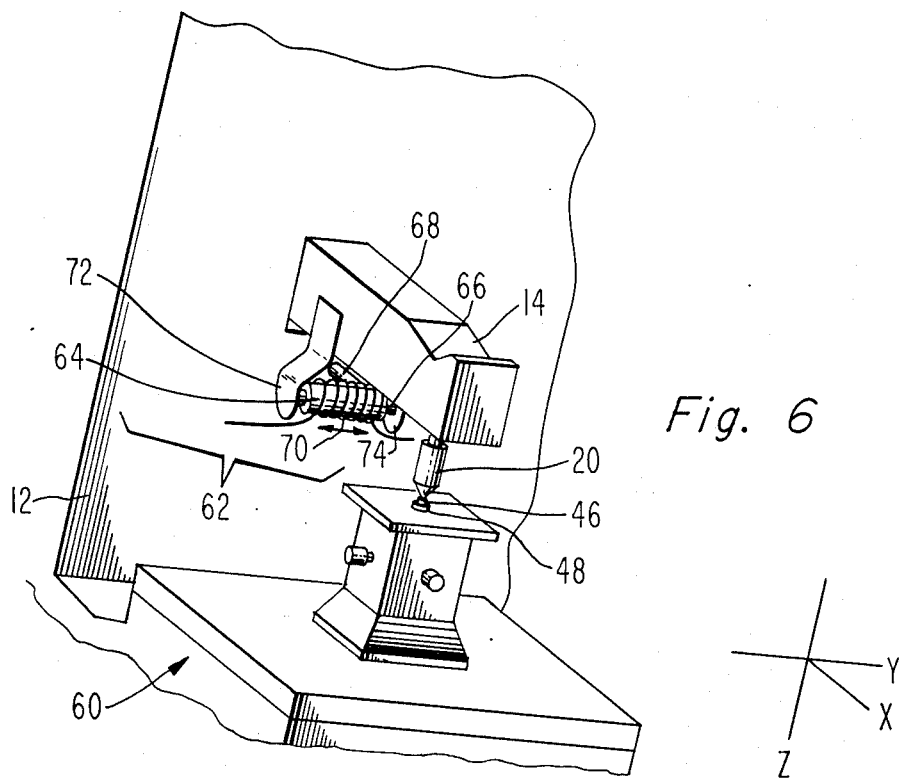
FIG. 6 illustrates an electrically induced scrubbing mechanism of the present invention.

FIG. 6 more clearly illustrates an embodiment of the electrical scrubbing means 62 of the present invention. A cylindrical air bearing 64, with a plunger 66 therethrough, is supported by a bracket 68. An electromagnetic coil is wrapped around the bearing 64 and connected to a variable AC power supply (not shown). When electrical power is applied to the coil 70 a reciprocal oscillation of the plunger 66 is induced at the frequency of the power supplied. The ends of the plunger 64 contact tabs 72 and 74 to impart this oscillation to the arm 14 along the y axis, i.e. perpendicular to the arm 14 and in the plane of the interface between the die and the substrate. Alternatively, the plunger 66 can be disposed so as to directly contact the arm 14 upon application of electrical power.

The tabs 72 and 74 can be of a rigid material so that the scrubbing motion of the holding means 20 directly corresponds to the amplitude and frequency of the oscillation of the plunger 66. Alternatively, the tabs 72 and 74 can be of flexible material. For instance, the tabs 72 and 74 may be of a thin gauge metal so that some of the amplitude of the oscillation of the plunger 66 is absorbed by the spring-like quality of the thinner gauge tabs 72 and 74. This provides a scrubbing motion of the holding means 20 at a frequency substantially equal to the frequency of the plunger 66, but where the holding means 20 virtually pulsates in the y direction, i.e. the displacement of the holding means 20 is less than the displacement of the plunger 66. In this way, smaller sensitive devices can be scrubbed or pulsated at frequencies higher than those provided by a mechanical scrub, but with less actual physical movement and shock to the device. The choice of tab material varies with the application but steel or aluminum tabs between about 0.067" and 0.125" thick (1.70 millimeters to 3.40 millimeters) have been found suitable for facet emitting devices.

The frequency can also be varied according to the size of the device. For the purposes of this invention, low frequency is defined as 500 Hz or below. For most facet-emitters frequencies between about 10 and 100 Hz have been found suitable. Depending upon the size of the device, higher frequencies may cause damage to the device and/or excess solder on the facets. For a typical 0.015"×0.020"×0.006" thick (0.320×0.508×0.152 millimeters) laser or LED, a preferred frequency range has been found to be 50 to 70 Hz. For smaller, more fragile emitters, typically about 0.007"×0.012"×0.004" thick (0.158×0.305×0.106 millimeters), frequencies below about 40 Hz should be employed for successful bonding. In the fabrication of a batch of laser devices bonded onto copper heatsinks with tin solder using a one second electrically driven scrub, thermal resistance values for the bonded devices decreased overall by about 60 percent. That is, the thermal conductivity of the solder joint was improved by about 60 percent as compared to a batch of similar devices mounted on a die bonder using mechanical scrubbing. Further, since the scrub was more uniform as compared to mechanical methods, little or no solder is found on the facets so that a minimal number of devices were rejected due to shorts. Finally, since the scrubbing motion of the die bonder of the present invention is along the y axis, as opposed to x axis oscillation of the prior art, the holding means and die can be aligned with the edge of a substrate and the die can be scrubbed and bonded thereto without any loss of die facet-to-substrate edge alignment.

The electrically driven scrubbing means in the die bonder of the present invention yields a more uniform, controllable scrub of a die into the solder. It enables machine bonding and scrubbing of small, fragile facet emitting semiconductor devices by providing less shock to devices, less solder on the device facets and greatly enhanced alignment of the devices to substrates onto which they are bonded.

We claim:

1. In a die bonder for bonding a semiconductor die to a substrate comprising:

a frame;

a support assembly within said frame, which supports an arm;

means attached to said arm for holding a semiconductor die;

means for moving said arm and holding means along the three orthogonal axes; and electrical scrubbing means for oscillating said arm and holding means at a low frequency along the axis perpendicular to the arm and in the plane parallel to the interface of the die and the substrate wherein said electrical scrubbing means comprises an electromagnetic coil with a plunger therethrough, which plunger is disposed so that when electrical power is applied to the coil, the plunger periodically contacts said arm at the frequency of the power applied;

the improvement wherein said electrical scrubbing means further comprises a flexible tab integral with said arm, which tab is contacted by the plunger, wherein the flexibility of the tab provides that upon oscillation the displacement of the holding means is less than the displacement of the plunger.

2. The die bonder of claim 1 wherein said tabs are of a metal.

3. The die bonder of claim 2 wherein said tabs are of aluminum.

4. The die bonder of claim 3 wherein said tabs are between about 1.7 and 3.4 millimeters thick.

* * * * *